United States Patent
Cervantes

(10) Patent No.: US 7,076,674 B2
(45) Date of Patent: Jul. 11, 2006

(54) PORTABLE COMPUTER HAVING DUAL CLOCK MODE

(75) Inventor: Jose L. Cervantes, Meridian, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 589 days.

(21) Appl. No.: 10/025,165

(22) Filed: Dec. 19, 2001

(65) Prior Publication Data

US 2003/0115494 A1 Jun. 19, 2003

(51) Int. Cl.
*G06F 1/26* (2006.01)

(52) U.S. Cl. .................. 713/310; 713/320; 713/322

(58) Field of Classification Search ............. 713/310, 713/320, 322, 600; 714/25; 711/5, 118
See application file for complete search history.

(56) References Cited

U.S. PATENT DOCUMENTS

| | | | |
|---|---|---|---|
| 5,142,684 A | 8/1992 | Perry et al. | |
| 5,167,024 A | 11/1992 | Smith et al. | |
| 5,305,452 A | 4/1994 | Khan et al. | |
| 5,420,808 A | 5/1995 | Alexander et al. | |
| 5,581,693 A * | 12/1996 | Pecone | 714/25 |
| 5,610,497 A * | 3/1997 | Croughwell | 307/70 |
| 5,619,707 A * | 4/1997 | Suboh | 713/322 |
| 5,948,105 A | 9/1999 | Skurnik et al. | |
| 5,949,812 A | 9/1999 | Turney et al. | |
| 5,991,883 A * | 11/1999 | Atkinson | 713/300 |
| 6,023,776 A * | 2/2000 | Ozaki | 714/55 |
| 6,263,448 B1* | 7/2001 | Tsern et al. | 713/501 |
| 6,336,166 B1* | 1/2002 | Kelly | 711/118 |
| 6,530,001 B1* | 3/2003 | Lee | 711/154 |
| 6,631,474 B1* | 10/2003 | Cai et al. | 713/300 |
| 6,763,478 B1* | 7/2004 | Bui | 713/600 |

FOREIGN PATENT DOCUMENTS

EP 973167 A2 * 1/2000

* cited by examiner

*Primary Examiner*—Thomas Lee
*Assistant Examiner*—Suresh K Suryawanshi

(57) ABSTRACT

The present invention provides a portable computer. In one aspect, the portable computer has a first power mode and a second power mode. The portable computer includes a memory bus and a control system coupled to the memory bus. The control system is configured to operate the memory bus at a first speed in the first power mode and a second speed different than a first speed in a second power mode.

27 Claims, 5 Drawing Sheets

PORTABLE COMPUTER HAVING DUAL CLOCK MODE

THE FIELD OF THE INVENTION

The present invention generally relates to portable computers and more particularly, to a portable computer having a dual clock mode system and method for optimizing system performance and extending battery life.

BACKGROUND OF THE INVENTION

Mobile computing devices or portable computers, such as laptop computers, have become increasingly popular. Mobile computing devices are battery powered in order to enhance their portability. A battery powered laptop computer operates for an extended period of time under battery power before the battery is either recharged or replaced. Alternatively, the mobile computing device may be powered from an external power source, such as an alternating current (AC) power source. As processor speeds and memory capacities of mobile computing devices have increased, so has their power consumption. At the same time, mobile computing devices have become increasingly smaller in size and weight.

It is important to reduce power consumption within an electronic circuit of the laptop computer, in order to extend the period of time during which the electronic circuit operates before recharging or replacing the battery. Known techniques disable power or disable clock signals (e.g., in a "sleep" or idle mode) to the electronic circuit in response to a specific time elapsing without sensing a particular type of activity. As such, it is desirable to limit the battery size within the mobile computing device.

Processor and memory bus clock speed corresponds directly to the amount of power required by the mobile computing device. Specifically, a faster clock speed results in increased power consumption, and a slower clock speed results in decreased power consumption. As such, most laptop computers are built with a clock speed which is much slower than similarly sized desktop computers, in order to reduce the power consumption and extend the amount of time that the laptop computer can be powered by a battery. It is desirable to have a mobile computing device which operates at a slower clock speed while battery powered, but is capable of operating at a higher clock speed when connected to an external (e.g., AC) power source.

SUMMARY OF THE INVENTION

The present invention provides a portable computer. In one aspect, the portable computer has a first power mode and a second power mode. The portable computer includes a memory bus and a control system coupled to the memory bus. The control system is configured to operate the memory bus at a first speed in the first power mode and a second speed different than the first speed in the second power mode.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
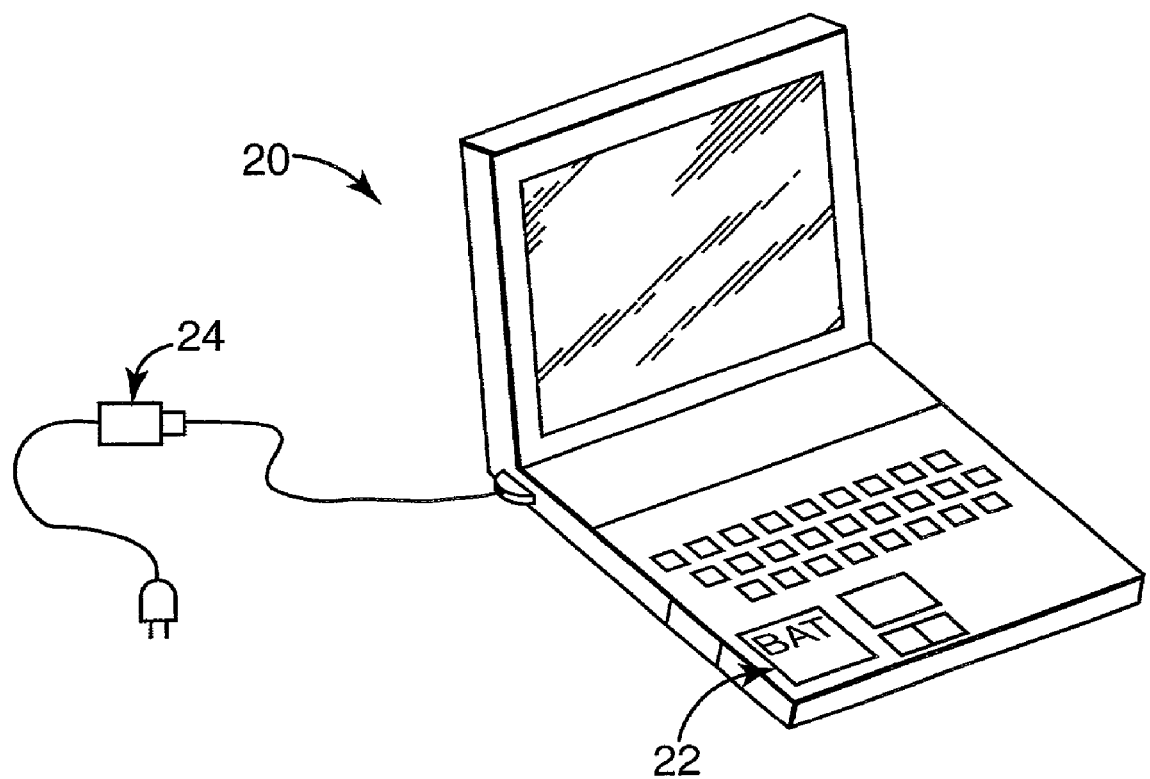
FIG. 1 is a perspective view illustrating one exemplary embodiment of a portable computer according to the present invention.

FIG. 1 is a perspective view illustrating one exemplary embodiment of a portable computer 20 according to the present invention. Portable computer 20 has a first power mode (e.g., a battery power mode) 22 and a second power mode (e.g., an external power mode) 24. In the first power mode 22, the portable computer 20 memory bus is operated at a first speed (e.g., a slow clock speed), and in the second power mode 24, the portable computer 20 memory bus is operated at a second speed different from the first speed (e.g., a fast clock speed).

By operating the memory bus at a relatively slow clock speed in the first power mode 22, power consumption by the portable computer 20 is reduced. This results in extending the amount of time that the mobile portable computer 20 can be operated in the first power mode 22. In the second power mode 24 the mobile computing device's memory bus is operated at a faster speed, resulting in improved performance of the portable computer 20. The increased operating speed results in more power consumption by the portable computer 20. Since in the second power mode 24 the portable computer 20 is powered via an external power source, a user is no longer concerned about the increased power consumption due to increasing the speed of the memory bus. The portable computer 20 may include other "power saving" components, such as changing the processor clock speed to components within the control system (e.g., entering a sleep mode) in addition to changing memory bus speed.

In one exemplary embodiment illustrated, the portable computer 20 is a laptop computer or a notebook computer. The term "portable computer" or "mobile computing device" as used herein also extends to other known mobile computing devices such as personal digital assistants (PDAs), or other devices having a first battery power mode and a second external power mode.

Figure 2:
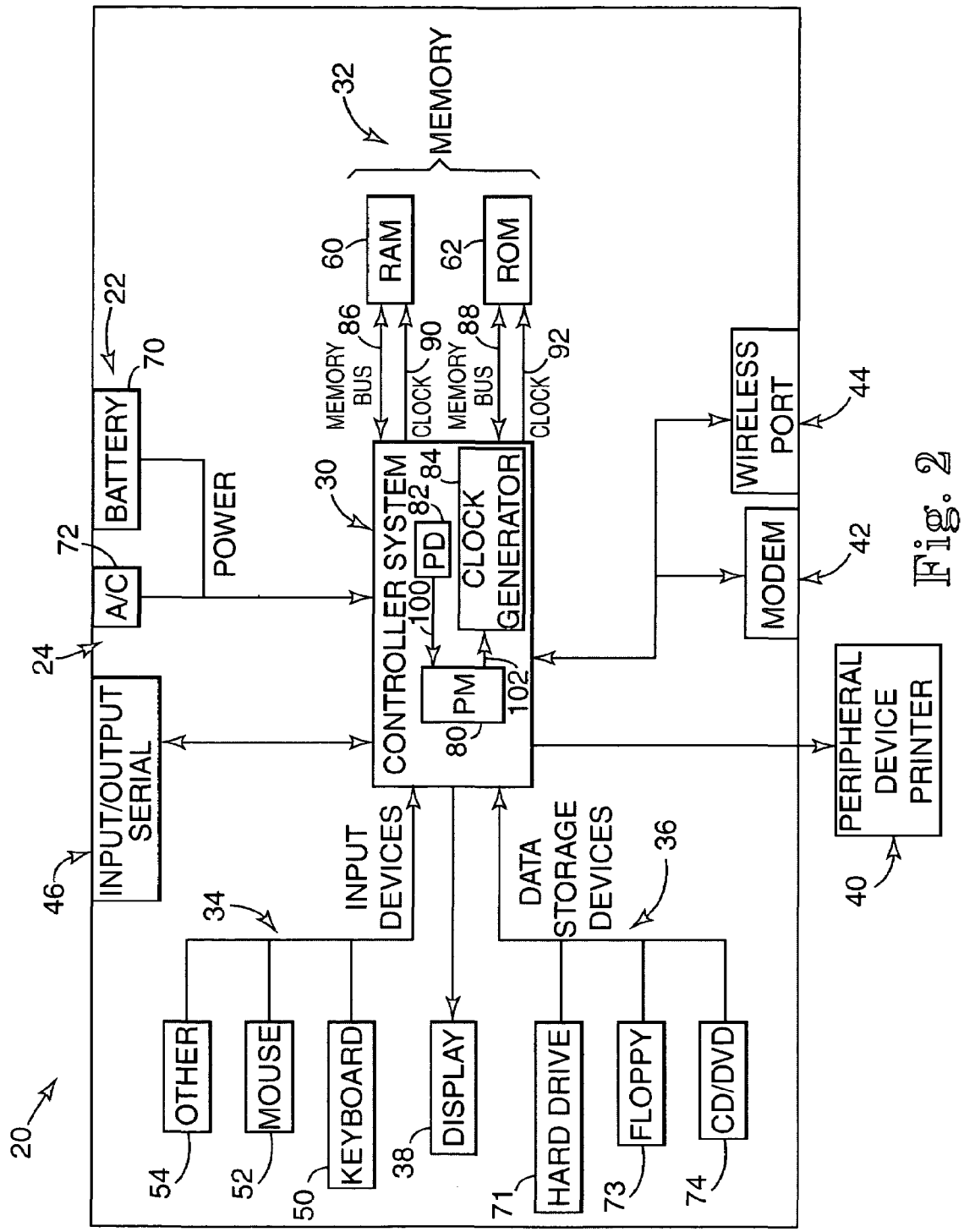
FIG. 2 is a block diagram illustrating one exemplary embodiment of the portable computer of FIG. 1.

FIG. 2 is a block diagram illustrating one exemplary embodiment of the portable computer 20 of FIG. 1. Portable computer 20 includes control system 30, memory 32, input devices 34, data storage devices 36, display 38, peripheral devices 40, modem 42, wireless port 44 and input/output port 46. Control system 30 provides for operation of the portable computer 20. Control system 30 includes a microprocessor having a set of internal instructions stored in memory and provides for the transfer of data and instructions between control system 30 and memory 32. In one aspect, memory 32 includes random access memory (RAM) 60 and read only memory (ROM) 62. In one aspect, control system 30 provides for the reading of operational instructions or code from ROM 62, and the reading and writing of data at RAM 60. In one embodiment, RAM 60 is dynamic random access memory (DRAM). Control system 30 can receive instructions or data from input devices 34, such as a keyboard 50, a mouse 52 or other input device 54. Control system 30 can receive and store data from various types of data storage devices 36, such as hard disk drive 71, floppy disk drive 73, or CD/DVD drive 74. Control system 30 can display data via display 38 as known in the art. Control device 30 can send data to peripheral devices 40 (e.g., a printer), or output and receive data via modem 42, wireless port 44, or input/output port 46.

Portable computer 20 is operable in a first power mode or a second power mode. In the exemplary embodiment shown, portable computer 20 is operable in the first power mode 22 via battery 70. Portable computer 20 is operable in a second power mode 24 via connection to an external power source 72. In one aspect, the external power source is an alternating current (AC) power source such as a 120 volt AC power source.

Controller system 30 includes a power manager 80, a power mode detector 82, and a clock generator 84. Power mode detector 82 and clock generator 84 are in communication with power manager 80. In one aspect, a first memory bus 86 is provided between controller system 30 and RAM 60 and a second memory bus 88 is provided between control system 30 and ROM 62. A first clock bus 90 is provided between control system 30 and RAM 60, and a second clock bus 92 is provided between control system 30 and ROM 62. Clock bus 90 determines the speed in which data is transferred between control system 30 and RAM 60 via first memory bus 86, and clock bus 92 determines the speed at which data is transferred between control system 30 and ROM 62 via second memory bus 88.

Power manager 80 operates to "manage" the power use of portable computer 20. In particular, power manger 80 operates to reduce power consumption by portable computer 20 when operating in a first power mode in 22 via battery 70. Power manager 80 operates to maximize system performance of portable computer 20 when portable computer 20 is in a second power mode 24 and connected to an external power source at 72. Power manager 80 can be implemented via software, hardware, or a combination of software and hardware.

In one aspect, power mode detector 82 determines whether the portable computer 20 is operating in a first power mode 22 or a second power mode 24, and provides a corresponding output signal 100 to power manager 80. In response to the output signal 100 received from power mode detector 82, power manager 80 provides a corresponding output signal 102 to clock generator 84 determining the desired speed at which clock generator 84 is to output clock signals on clock bus 90 and clock bus 92. In one exemplary embodiment, power mode detector 82 determines that portable computer 20 is operating in a first or battery power mode 22, and provides a corresponding output signal 100 to power manager 80. In response, power manager 80 provides an output signal 102 to clock generator 84, indicating that portable computer 20 is to provide an output clock signal to clock bus 90 and clock bus 92. The output clock signal operates to transfer data via memory bus 86 and memory bus 88 at a first or slow speed, since the portable computer 20 is operating from battery 70 and as such it is desirable to reduce power consumption by the portable computer 20.

In another aspect, power mode detector 82 determines that the portable computer 20 is being powered in a second power mode 24 via an external power source 72. Power mode detector 82 provides a corresponding output signal 100 to power manager 80. In response, power manager 80 provides a corresponding output signal 102 to clock generator 84. Clock generator 84 responds by providing a fast clock signal output to clock bus 90 and clock bus 92 for determining the speed of data transferred via memory bus 86 and memory bus 88. In one aspect, the clock signal provided by clock generator 84 in the first power mode 22 is the same as the clock signal provided by clock generator 84 in the second power mode 24. In another aspect, the clock signal provided in the second power mode 24 is different than the clock signal provided in the first power mode 22. In one aspect, the clock signal in the second power mode 24 is faster than the clock signal in the first power mode 22. In one exemplary embodiment, the clock signal provided in the second power mode 24 is double the speed of the clock signal provided in the first power mode 22 (e.g., a first power mode clock speed of 66 megahertz, and a second power mode clock speed of 133 megahertz).

Figure 3:
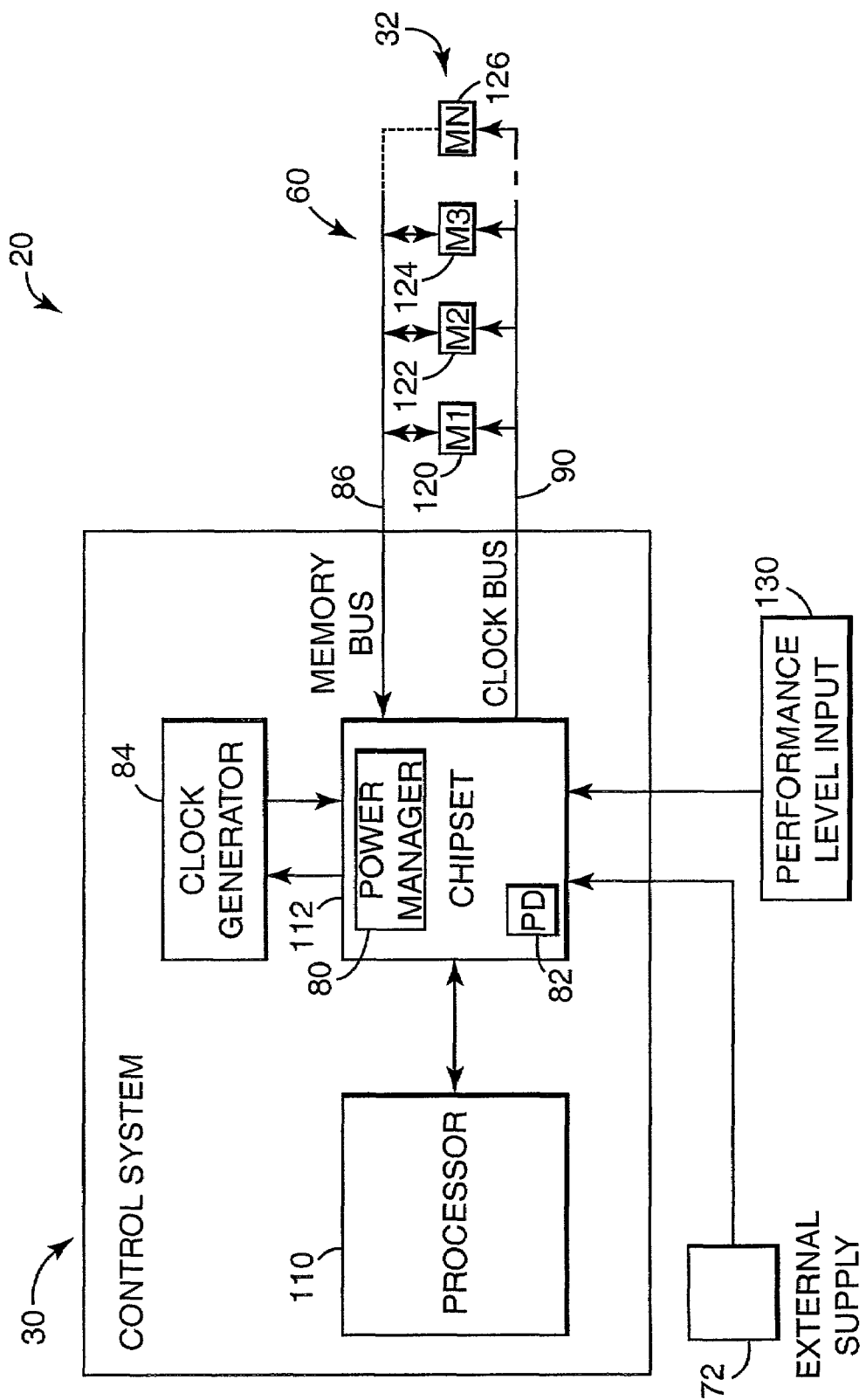
FIG. 3 is a block diagram illustrating one exemplary embodiment of a portion of a portable computer according to the present invention.

FIG. 3 is a block diagram illustrating a portion of mobile computing device 20 including control system 30 and memory 32. In one aspect, control system 30 includes a processor 110 and a chipset 112. Chipset 112 provides for controlling data transfers between the processor 110 and other devices internal and external to portable computer 20, such as performing the functions of controlling temporary or cache memory, performing direct memory access (DMA), handling interrupt, transferring data via the I/O port, etc. In one aspect, chipset 112 includes one or more application-specific integration circuits (ASICs). One suitable chipset is commercially available from Intel Corporation.

In one exemplary embodiment, chipset 112 includes power manager 80 and power mode detector 82. Chipset 112 is in communication with clock generator 84. Clock generator 84 may be located internal to chipset 112, or external to chipset 112 either inside of control system 30 or external to control system 30. In one aspect, memory 32 includes RAM 60 configured as a "memory bank" of RAM chips, indicated as memory M1 120, memory M2 122, memory M3 124, memory MN 126. Each memory chip is in communication with control system 30 via memory bus 86. The memory bus speed or the speed at which data is transferred via memory bus 86 is determined by clock bus 90. As previously described herein, power mode detector 82 determines whether portable computer 20 is operating in a first power mode 22 or a second power mode 24. In response, power manager 88 determines the clock speed provided by clock generator 84 to clock bus 90.

Portable computer 20 may further include a performance level input 130, which may be input or defined via an input device 34. Performance level input 130 provides a method for defining the memory bus speed for first power mode 122 and second power mode 24. In one aspect, the performance level input 130 is input to control system 30 via a graphical user interface (e.g., a window-based user interface).

In one embodiment, RAM 60 is DRAM, having an access speed corresponding to the memory bus speed. Exemplary embodiments of DRAM technology suitable for use with the present invention includes conventional DRAM, page mode, FPM, EDO, BEDO, Synchronous DRAM (SDRAM), DDR SDRAM, DRDRAM, SLDRAM. Other suitable memory technologies will become apparent to one skilled in the art after reading the present application.

Figure 4:
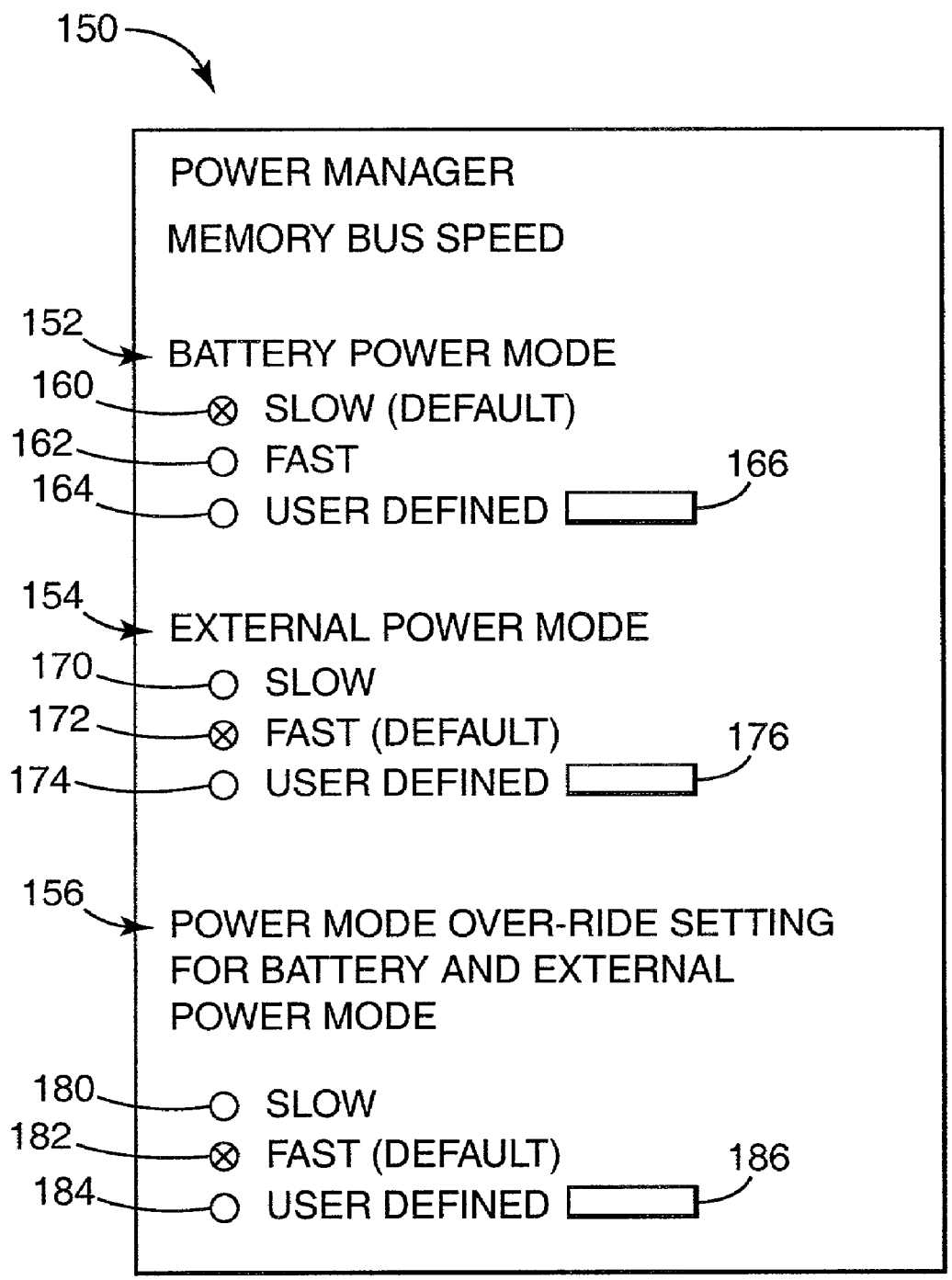
FIG. 4 is a diagram illustrating one exemplary embodiment of a graphical user interface used in a portable computer according to the present invention.

FIG. 4 is a diagram illustrating one exemplary embodiment of a graphical user interface for use as a performance level input 130 according to the present invention. The graphical user interface 150 is used as part of power manager 80 for defining the memory bus speed for a first power mode 22 and a second power mode 24. In one aspect, graphical user interface 150 includes a battery power mode field 152, an external power mode field 154, and a power mode over-ride setting for battery and external power mode 156. In the battery power mode 152, a user may select a slow memory bus speed 160 or a fast memory bus speed 162. The slow memory bus speed 160 and fast memory bus speed 162 can be predefined based on the components of the specific portable computer 20, such as the speed of RAM 60 and control system 30. In one exemplary embodiment, the slow memory bus speed 160 is 66 megahertz and the fast memory bus speed 162 is 133 megahertz. Alternatively, the battery power mode 152 may select a user defined memory bus speed 164. If a user defined memory bus speed 164 is selected, an active field 166 is provided for allowing the user to input the desired memory bus speed in the battery power mode 152.

Similarly, in the external power mode 154 a user may select a slow memory bus speed 170, a fast memory bus speed 172 or a user defined memory bus speed 174. Again, if the user defined memory bus speed 174 is selected, an active input field 176 is provided for allowing the user to input a desired memory bus speed.

Situations may exist when it is desirable for a user to over-ride the default or defined settings for the battery power mode 152 and external power mode 154. As such, battery power mode over-ride setting for battery in external power mode 154 is provided to predefine such a situation. Again, a user may select a slow memory bus speed 180, a fast memory bus speed 182, or a user defined memory bus speed 184. If the user defined memory bus speed 184 is selected, a user is provided with an active input field for inputting a desired memory bus speed, indicated at 186. In one aspect, the power mode over-ride setting provides the memory bus speed for both the battery power mode 152 and the external power mode 154, and as such, the memory bus speed for the battery power mode 152 and the external power mode 154 will be the same.

Figure 5:
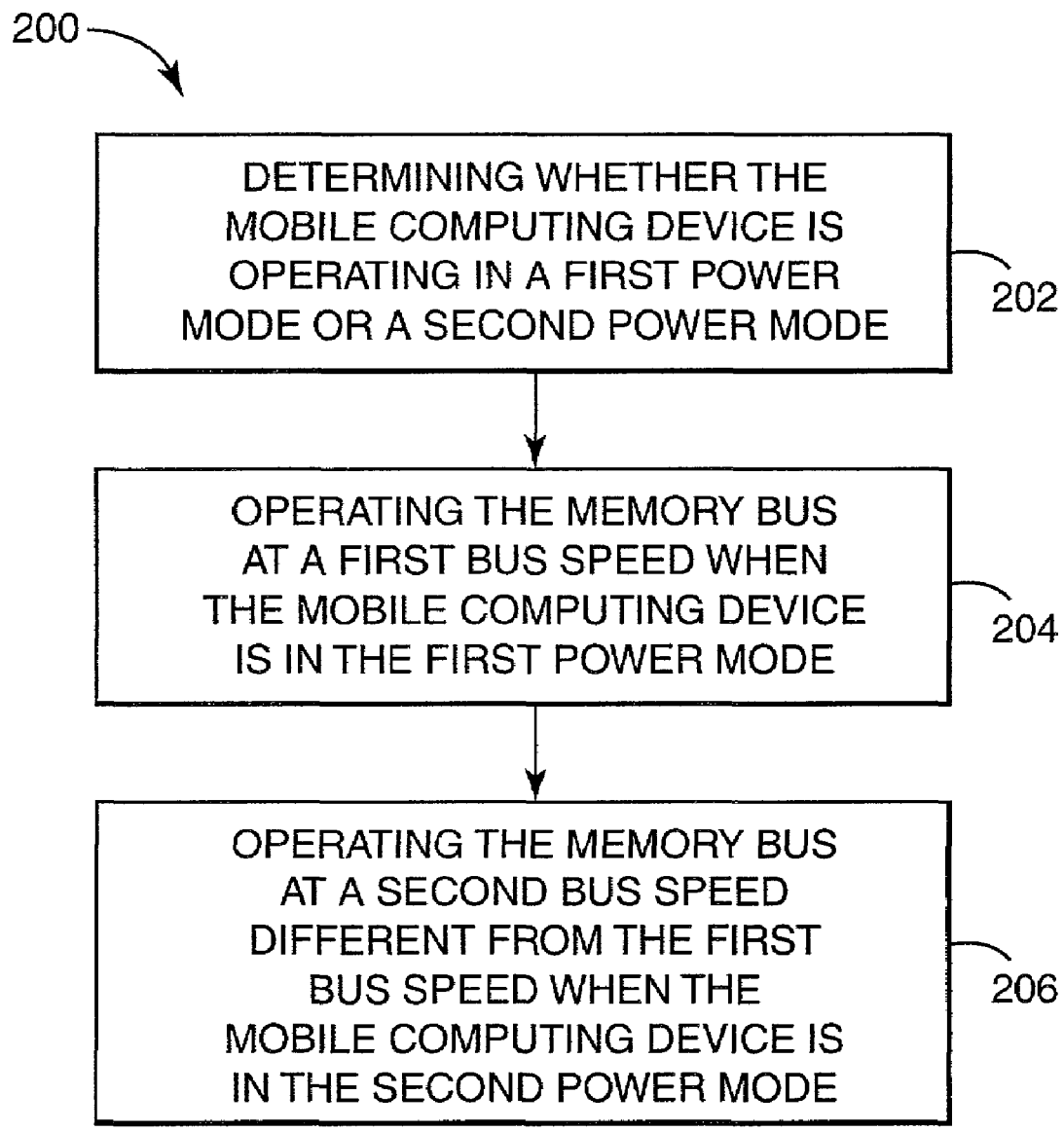
FIG. 5 is a flow chart illustrating one exemplary embodiment of a method of managing power in a portable computer according to the present invention.

FIG. 5 is a flow chart illustrating one exemplary embodiment of a method of managing power in a mobile computer system, according to the present invention.

At 202, it is determined whether the portable computer is operating in a first power mode or a second power mode. At 204, the memory bus is operated at a first bus speed when the mobile computing device is in the first power mode (e.g., a battery power mode). At 206, the memory bus is operated at a second bus speed different from the first bus speed when the mobile computing device is in the second power mode (e.g., an external AC power source).

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A portable computer having a first power mode and a second power mode, comprising:
    a first memory bus;
    a second memory bus;
    a control system coupled to the first memory bus and the second memory bus, wherein the control system is configured to operate the first memory bus and the second memory bus at a first speed in the first power mode, and a second speed different than the first speed in the second power mode; and
    a performance level input in communication with the control system for defining the first clock speed and the second clock speed wherein the performance level input is configured to allow a user to select between a slow memory bus speed or a fast memory bus speed relative to the slow memory bus speed for the first clock speed and the second clock speed.

2. The computer of claim 1, where in the first power mode, the portable computer is operated via a battery power source, and in the second power mode the computer is operated via an external power source.

3. The computer of claim 1, further comprising a power mode detector which detects whether the portable computer is in the first power mode or the second power mode.

4. The computer of claim 1, wherein the control system includes the power mode detector.

5. The computer of claim 1, wherein the second bus speed is double the first bus speed.

6. The computer of claim 1, further comprising a clock generator coupled to the control system for generating a clock corresponding to the first bus speed and the second bus speed.

7. The computer of claim 1, further comprising a bus speed input for switching the portable computer between the first bus speed and the second bus speed.

8. The computer of claim 1, wherein the control system includes processor and a chipset.

9. The computer of claim 8, wherein the first memory bus and the second memory bus are in communication with the chipset.

10. The computer of claim 1, further comprising an override switch coupled to the control system for switching the first memory bus and the second memory bus to the first speed or the second speed.

11. A computer having a first battery power mode and a second external power mode, the computer comprising:
    a random access memory;
    a read only memory;
    a first memory bus in communication with the random access memory;
    a second memory bus in communication with the read only memory;
    a control system coupled to the first memory bus for reading and writing the random access memory and to the second memory bus for reading the read only memory, the control system including a clock generator, wherein the control system is configured to operate the first memory bus and the second memory bus at a first clock speed in the first battery power mode, and a second clock speed greater than the first clock speed in the second power mode; and a performance level input in communication with the control system for defining the first clock speed and the second clock speed wherein the performance level input is configured to allow a user to select between a slow memory bus speed or a fast memory bus speed relative to the slow memory bus speed for the first clock speed and the second clock speed.

12. The computer of claim 11, further comprising a power mode detector which provides an indicator to the control system as to whether the portable computer is in the first battery power mode or the second external power mode.

13. The computer of claim 11, wherein the second bus speed is double the first bus speed.

14. The computer of claim 12, further comprising a bus speed input for switching the portable computer between the first bus speed and the second bus speed.

15. The computer of claim 1, wherein the control system includes a processor and a chipset.

16. The computer of claim 8, wherein the first memory bus and the second memory bus are in communication with the chipset, and the chipset is in communication with the clock generator.

17. A mobile computing device having a first battery power mode and a second external power mode, the device comprising:
 a random access memory;
 a read only memory;
 a first memory bus in communication with the random access memory;
 a second memory bus in communication with the read only memory;
 a control system coupled to the first memory bus for reading and writing the random access memory and to the second memory bus for reading the read only memory, the control system including a clock generator, wherein the control system is configured to operate the first memory bus and the second memory bus at a first clock speed in the first battery power mode, and a second clock speed greater than the first clock speed in the second power mode; and
 a performance level input in communication with the control system for defining the first clock speed and the second clock speed wherein the performance level input is configured to allow a user to select between a slow memory bus speed or a fast memory bus speed relative to the slow memory bus speed for the first clock speed and the second clock speed.

18. The device of claim 17, wherein the mobile computing device is a laptop computer.

19. The device of claim 17, wherein the mobile computing device is a personal digital assistant.

20. The device of claim 17, wherein in the first battery power mode the device is coupled to an internal battery power supply, and in the second external power mode the device is coupled to an external battery power supply.

21. A method of managing power in a mobile computing device comprising:
 determining whether the mobile computing device is operating in a first power mode or a second power mode;
 operating a first memory bus and a second memory bus at a first bus speed when the mobile computing device is in the first power mode;
 operating the first memory bus and the second memory bus at a second bus speed different from the first bus speed when the mobile computing device is in the second power mode; and
 a performance level input for defining the first bus speed and the second bus speed wherein the performance level input is configured to allow a user to select between a slow memory bus speed or a fast memory bus speed relative to the slow memory bus speed for the first bus speed and the second bus speed.

22. The method of claim 21, further comprising controlling a clock generator to determine the first bus speed and the second bus speed.

23. The method of claim 21, further comprising:
 determining the first bus speed and the second bus speed independent of an internal processor bus speed.

24. The method of claim 21, further comprising:
 defining the first power mode to be a battery power mode; and
 defining the second power mode to be an external power source mode.

25. A mobile computing device having a first battery power mode and a second external power mode, the device comprising:
 a random access memory;
 a read only memory;
 a first memory bus in communication with the random access memory;
 a second memory bus in communication with the read only memory;
 a control system coupled to the first memory bus for reading and writing the random access memory and to the second memory bus for reading the read only memory;
 a clock generator in communication with the control system, wherein the control system is configured to operate the first memory bus and the second memory bus at a first clock speed in the first battery power mode, and a second clock speed in the second power mode; and
 a performance level input in communication with the control system for defining the first clock speed and the second clock speed wherein the performance level input is configured to allow a user to select between a slow memory bus speed or a fast memory bus speed relative to the slow memory bus speed for the first bus speed and the second bus speed.

26. The device of claim 25, further comprising:
 wherein the performance level input is configured to allow a user to select a user defined memory bus speed for the first clock speed and the second clock speed.

27. The device of claim 25, further comprising:
 wherein the performance level input is configured to include a power mode over-ride setting for the first battery power mode and the second power mode, including allowing a user to select between a slow memory bus speed, a fast memory bus speed, or a user-defined memory bus speed.

* * * * *